United States Patent [19]

Maisenbacher et al.

[11] 4,330,944
[45] May 25, 1982

[54] ARRANGEMENT FOR THE TESTING OF A THREAD

[75] Inventors: Hans Maisenbacher, Oberndorf; Harald Martin, Schönwald, both of Fed. Rep. of Germany

[73] Assignee: Mauser-Werke Oberndorf GmbH, Oberndorf, Fed. Rep. of Germany

[21] Appl. No.: 173,333

[22] Filed: Jul. 29, 1980

[30] Foreign Application Priority Data

Aug. 1, 1979 [DE] Fed. Rep. of Germany ....... 2931273

[51] Int. Cl.³ ........................... G01B 3/48; G01B 5/16
[52] U.S. Cl. .................................................. 33/199 R
[58] Field of Search ............ 33/174 R, 174 L, 174 Q, 33/199 R, 199 B

[56] References Cited

U.S. PATENT DOCUMENTS 1,983,279 12/1934 Fletcher ............................. 33/170
3,047,960 8/1962 Mittenbergs et al. ............. 33/199 R
3,324,562 6/1967 Kelso ............................ 33/174 R X

FOREIGN PATENT DOCUMENTS 1502477 1/1971 Fed. Rep. of Germany .
2260884 6/1974 Fed. Rep. of Germany .
2733339 7/1977 Fed. Rep. of Germany .... 33/199 R Primary Examiner—Harry N. Haroian
Attorney, Agent, or Firm—Scully, Scott, Murphy & Presser

[57] ABSTRACT

A machine is disclosed for testing of the oppositely located position of mechanical thread and a contact shoulder associated therewith on a pipe. A first measuring support is movably supported on a guide block in a first direction of movement and a second measuring support is resiliently supported on the first support in a linearly second direction of movement. First and second measuring heads are provided for movement in the first and second directions for measuring the threads and shoulder positions.

11 Claims, 4 Drawing Figures

ARRANGEMENT FOR THE TESTING OF A THREAD

The invention relates to an arrangement for a processing machine for the testing of the oppositely located position of mechanical thread and a contact shoulder associated therewith through the intermediary of a sensing device, wherein a first measuring support is movably supported on a guide block so as to be movable relative thereto in a first direction of movement, and a second measuring support is resiliently supported on the first measuring support in a linearly second direction of movement, and wherein there is provided a first measuring head adapted to be moved towards the thread in the first direction of movement, as well as a second measuring head which adapted to be moved towards the contact shoulder in the second direction of movement.

An arrangement of that type is known from German Laid-open Patent Application No. 27 33 33 9. In this publication, the two measuring supports are rotatably arranged on a guide rod concentrically relative to each other. They are axially displaceable with respect to each other. Provided on the first measuring member is a threaded member which can be screwed on to the thread, and a planar surface is provided on the second measuring member associated with the contact shoulder. By means of the sensing device there is determined the relative position of the measuring members with respect to each other. Through this arrangement there is carried out the measurement of the contact shoulder prior to the final processing step. Hereby due to the measurement the processing is interrupted. In particular at a manual input of the measured value determined by the measuring arrangement into the control of the machine tool, this signifies an increase in the manufacturing time periods.

The mentioned measuring arrangements merely provides a correcting measure for the contact shoulder. Instances in which there is to be subsequently obtained the desired mutually opposite position of the threading and of the contact shoulder can only be achieved through the subsequent processing of the threading, and cannot be achieved with the arrangement pursuant to the German Laid-open Patent Application No. 27 33 33 9.

Moreover, it is disadvantageous that the arrangement operates with a conical threaded member since this produces the danger that this will wedge together with the work piece.

The arrangement according to German Laid-open Patent Application No. 27 33 33 9 is provided for the processing of the external threads of the drill heads for oil well drills. Tubes with conical threads and a contact shoulder which is associated therewith are inserted into pipelines. Hereby, each of the conduits evidences on one side an external threading and a corresponding internal threading on the other side, or only outer or inner threadings. The contact shoulder serves the necessary sealing between the two conduits. This will afford that after the assembly of two conduits will sealingly contact other, and the opposite position of the conical threading and the contact shoulder is to be controlled at each conduit end.

The control of the mutually opposite position of the conical threading and the contact shoulder has been heretofore so undertaken at an external threading, that a threaded idling ring with conical internal thread is threaded so far on to the external threading of the conduit or pipe, until it is rigidly seated thereon. Thereafter there is measured the distance between the threaded idling ring and the contact shoulder. When the measured result corresponds to the reference value then the mutually opposite position of the conical threading and the contact shoulder is correct. When the measured distance is smaller than the reference value than the shoulder must be reworked. In contrast therewith, if the measured distance is greater than the reference value, then the threading must be cut back.

Correspondingly, until now there has also been measured the internal threading of the conduit or pipe. In this instance a threaded idling mandrel with reference measures has been threaded into the internal threading until it is seated fast. When the threaded mandrel extends beyond the contact shoulder, then the internal threading must be cut down.

In actual practice the threading idling ring and the threading mandrel have a significant weight due to the diameter of the pipes. In order to screw the threading idler ring or respectively the threading mandrel onto the conduit, it is generally required to use hoists. The utilization of such hoists and the manual measurement of the position of the threading idler ring or respectively the threading mandrel on the respective threading render the measuring process time consuming. Since the processing machine which produces the threading and the contact shoulder cannot be processed during the measurement, a time consuming measuring sequence adversely effects the degree of utilization of the processing machine.

Accordingly, it is an object of the present invention to contemplate an arrangement of the above mentioned type which in accordance with the measurement of the processed work piece affords a correcting measure for the contact shoulder or threading to be taken off and which is constructed simply and assuredly in operation.

Inventively, in an arrangement of the above mentioned type the foregoing object is achieved in that for the movement of the first measuring head onto the threading, the first measuring support is displaceable in the first direction of measurement linearly opposite the guideblock and the first direction of movement is located at an angle of 90° relative to the second direction of movement, and that a first sensing device determines the path of displacement of the first measuring carrier or respectively the first measuring head in the first direction of movement in a second sensing device determines the path of displacement of the second measuring head in the second direction of movement.

For the testing of the opposite position of the conical threading and the contact shoulder, the guide block or respectively the carriage of the processing or work tool machine is so moved into a predetermined position that the first measuring head comes into engagement with the threading of the respective conduit. Thereby there is displaced the first measuring head. The extent of the displacement determined by the first sensing device corresponds to the present thread diameter. The second sensing device determines the position of the contact shoulder. The output magnitudes of the two sensing devices are in communication with each other. They determine as to whether the threading or the contact shoulder is to be further worked. Utilized as sensing devices are preferably inductive sensors, whose electrical output signals are to be processed with each other through the usual electronic means.

Through the invention there is provided an arrangement which can be located on the processing machine, in particular, an NC or program controllable work tool. By means of the carriage of the work tool machine the arrangement is moved onto and against a conduit end which is to be tested. The arrangement senses the necessary magnitudes required for the testing whereby a manual threading on of the threading idler rings or threading manuals and their subsequent measurement becomes superfluous.

Through the invention there is avoided a measuring head which, for example, must be screwed onto the threading. The utilized measuring head is merely moved against the threading. The measuring head evidences preferably at least one tooth conforming to the threading. The first measuring head can thereby not only be assuredly moved against the threading, but also can be easily moved away from the threading without that any wedging can occur.

The utilization of the inventive arrangement facilitates an extremely rapid determination of the corrective measure for the threading or contact shoulder. There is no interruption of the processing sequence since the measurement is effectuated subsequent to the final step.

Advantageous embodiments of the invention may be ascertained from the various claims and from the following detailed description setting forth exemplary embodiments. In the accompanying drawings:

Figure 1:
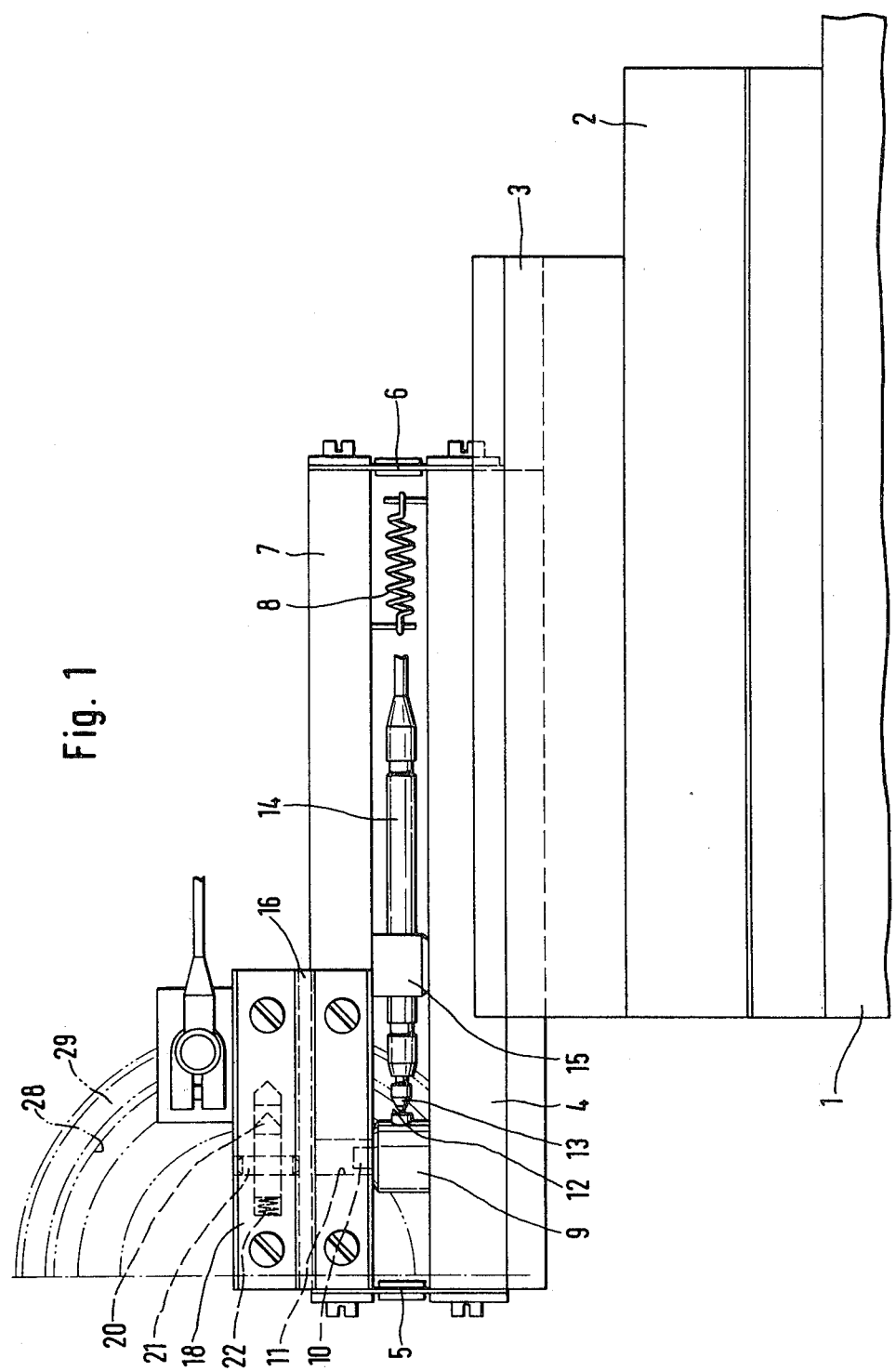
FIG. 1 illustrates a testing arrangement for a conduit inner threading in a side view.
Figure 2:
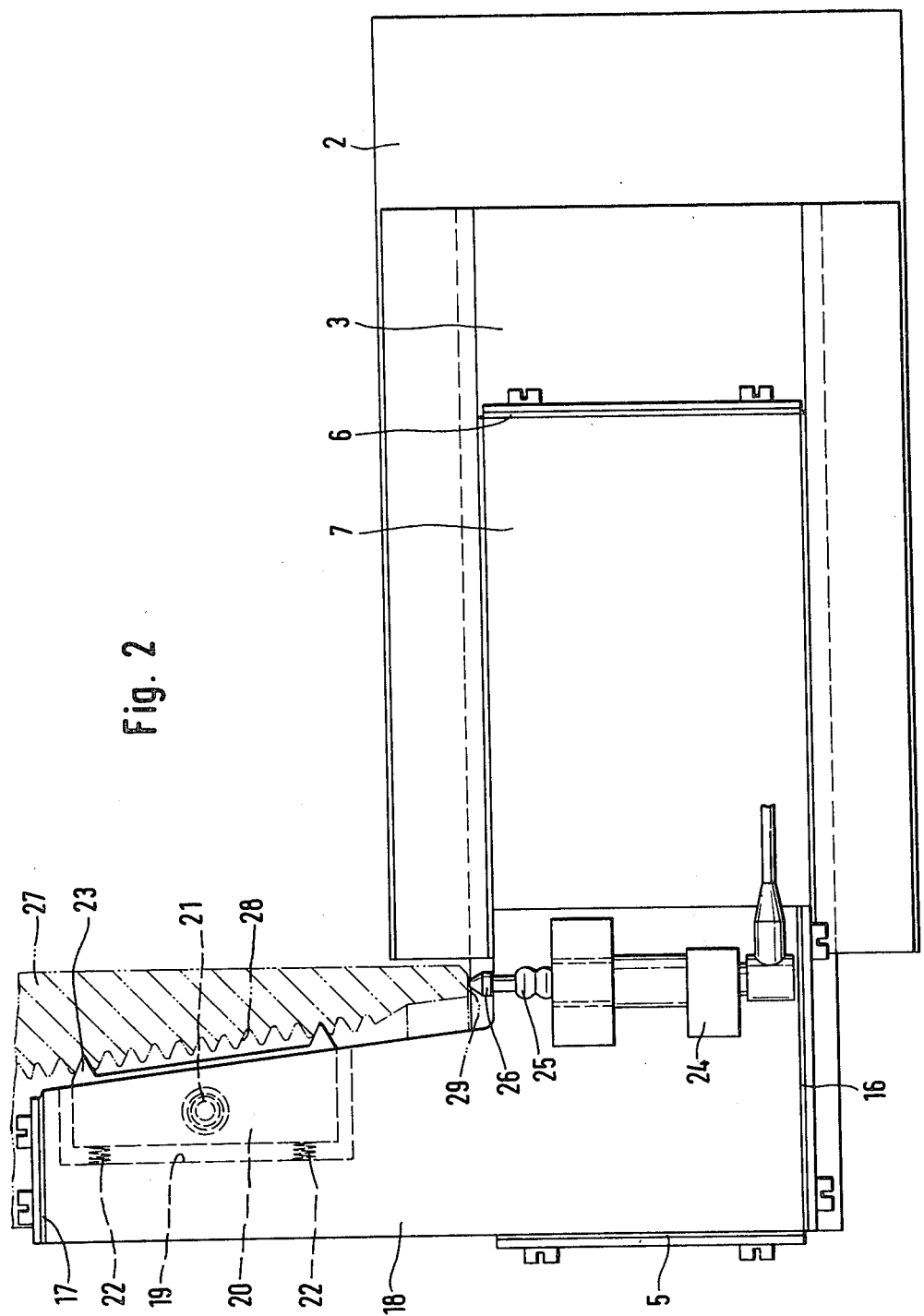
FIG. 2 is a plane view of the arrangement according to FIG. 1.

In FIGS. 1 and 2 a roll carriage 2 is arranged on a pull carriage 1 of a work tool machine. Seated thereon is a guide member on which there is fastened a block 4. At the end of the block 4 which is displaceable by means of the pull carriage 1 there are seated leaf springs 5 and 6. Fastened intermediate the free ends of the two leaf springs 5 and 6 is a first measuring support 7. The latter is thereby displaceable in a parallelogram configuration relative to the block 4. Intermediate the block 4 and the first measuring support 7 there is effective a pull spring 8 which impresses a pretension to the leaf springs 5 and 6. Fastened onto the block 4 is a bolt 9 with a projection 10. The projection 10 engages in a ball 11 in the measuring support 7. Thereby there is limited the possible path of displacement of the measuring support 7 relative to the block 4.

A contact surface 12 is formed on the bolt 9 against which there engages the measuring pin 13 of a first sensing device 14 which is formed by an inductive sensor. The sensing device 14 is retained by means of a fastening elbow 15 against the bottom surface of the measuring support 7.

In the embodiment pursuant to FIGS. 1 and 2 the first measuring support is formed in an L-shape so as to be able to engage into internal threading (refer to FIG. 2).

At the edges of the measuring support 7 which are right angled relative to the leaf springs 5 and 6 there are fastened further leaf springs 16 and 17. A second measuring support 18 is arranged intermediate the free ends of the leaf springs 16 and 17.

On the measuring support 18 a first measuring head 20 is pivotally supported on a trunnion 21 within a recess 19. The measuring head 20 is tiltable about the trunnion 21 against springs 22. The measuring head 20 is provided with two teeth 23 at the oppositely located ends whose profile and distance are correlated with the threading which is to be measured.

A second sensing device 24, which may also be constructed by an inductive sensor, is fastened to the second measuring support 18. In the embodiment pursuant to FIGS. 1 and 2, a measuring pin 25 forms the inductive sensor 24 of a second measuring head 26 which is determined for compacting against a contact shoulder of the conduit or pipe which is to be tested.

The described arrangement which is represented in FIGS. 1 and 2 for the testing of the mutually opposite position of an internal threading and a contact shoulder operates generally as follows:

As long as on a pipe 27 there is produced an internal threading 28 and contact shoulder 29 through the intermediary of the usual work tool are fastened onto the pulling carriage 1, the block 4 is pulled back by means of the roll carriage 2. For the testing of the finished internal threading 28 and the contact shoulder 29, the rolling carriage 2 is moved against a fixed stop in a position illustrated in FIGS. 1 and 2. Thereafter, by means of the pull carriage 1 the measuring head 20 is conveyed into a predetermined position against the internal threading 28 which is programmed in the work tool machine. Such a position illustrated in FIGS. 1 and 2. The leaf springs 16 and 17 assure that an axial displacement of the measuring head 20 relative to the conduit 27 is so possible that the teeth 23 thereof will engage into the threading of the internal threading 28. In accordance as to whether the diameter of the internal threading 28 is located above or below the reference value, the first measuring support 7 is more or less displaced relative to the block 4 against the effect of the leaf springs 5 and 6 or respectively the pull spring 8. The present extent of displacement is determined by the inductive sensor 14. The inductive sensor 24 detects the distance of the measuring support 18 from the contact shoulder 29. Hereby there can occur different groups of cases. When the middle internal diameter of conical inner threading 28 is to large and the contact shoulder 29 is correspondingly shorter, than a fixed and more sealed seating of a conduit end which is to be threaded onto the internal threading 28 is not influenced, so that any subsequent working is superfluous. The same is applicable for the reverse case. Only when the actual positions of the conical internal threading 28 and the contact shoulder 29 are so offset that the deviations will stand in opposition to a safe seating of a complimentary threading or respectively a complimentary shoulder, then will there become necessary a subsequent working of the internal threading or respectively the contact shoulder.

Figure 3:
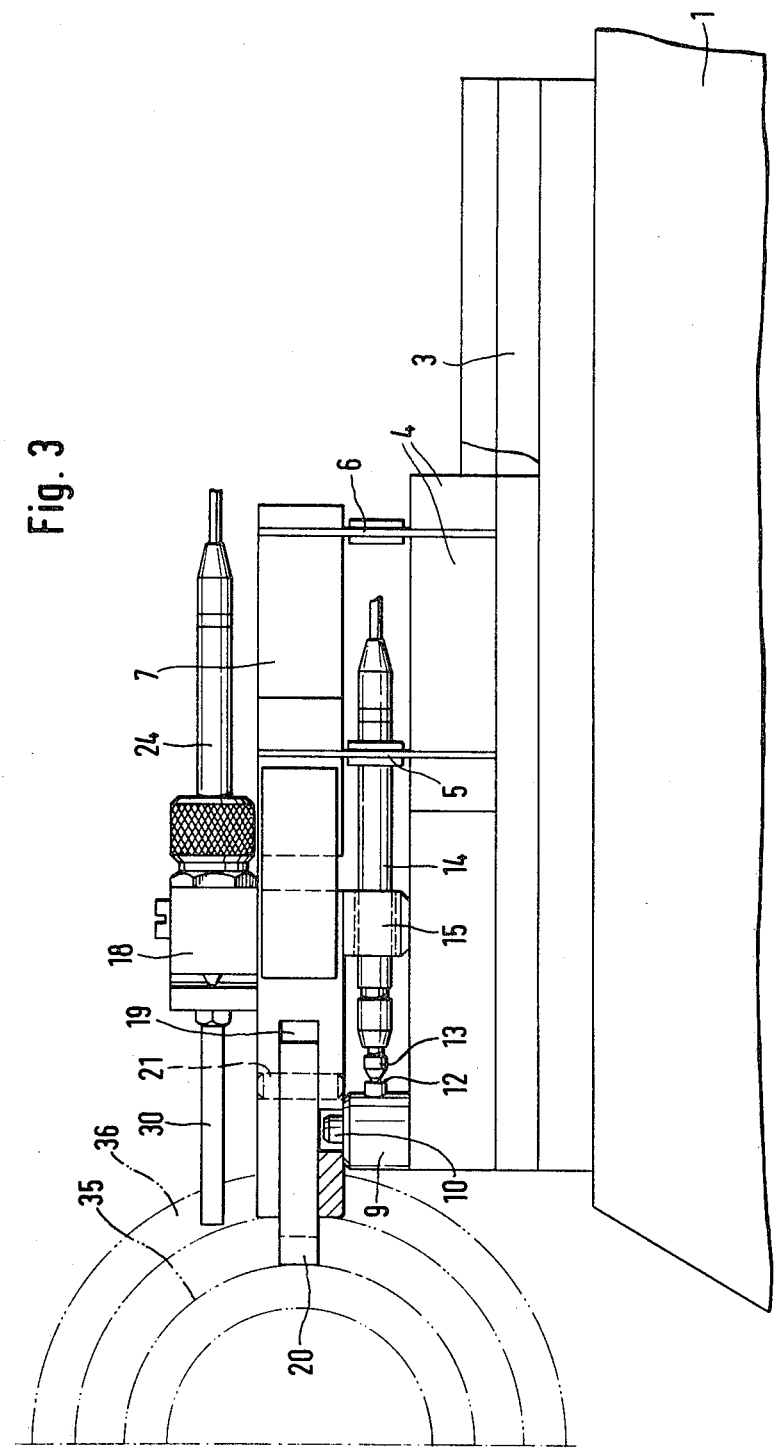
FIG. 3 is a testing arrangement for a conduit external threading in a side view.
Figure 4:
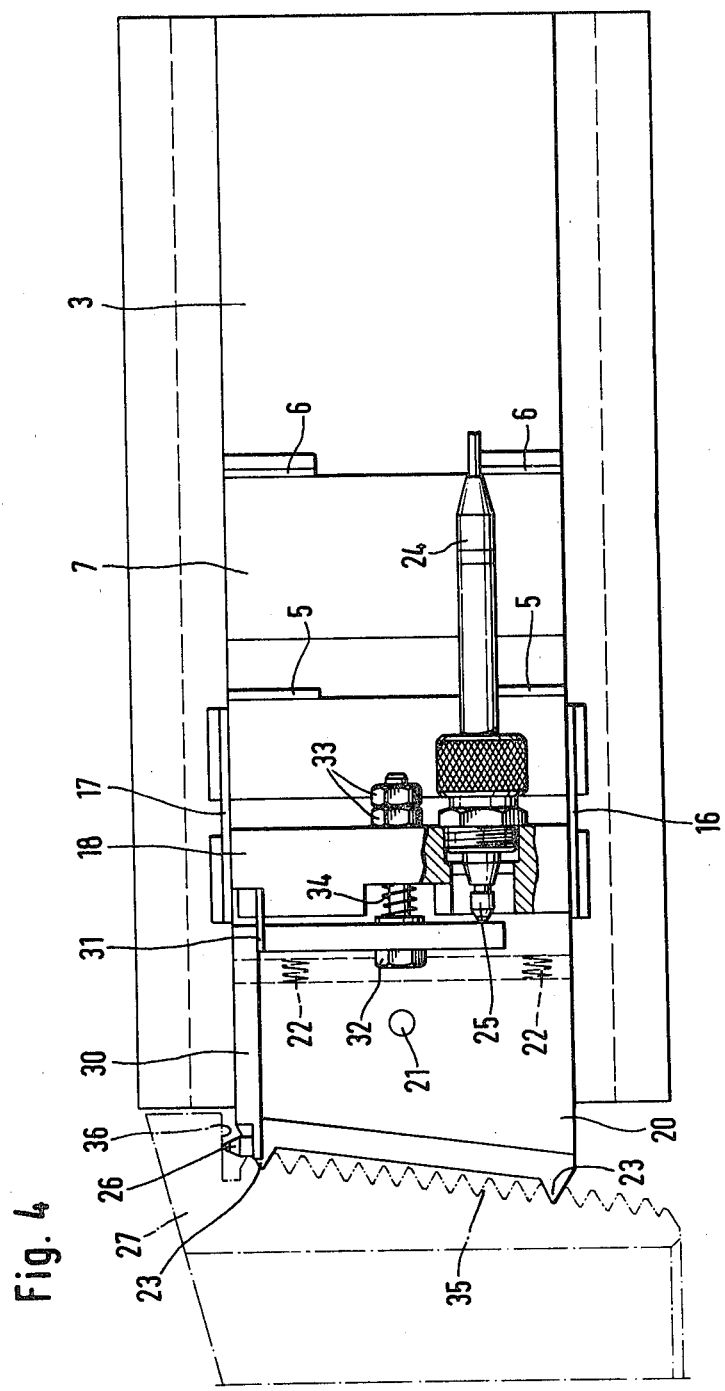
FIG. 4 illustrates a plane view of the arrangement of FIG. 3.

In FIGS. 3 and 4 there is illustrated a testing arrangement for the outer threading of a conduit or pipe. The components which correspond to those shown in FIGS. 1 and 2 are designated with the same reference numerals. The second sensing device 24 is arranged on a second measuring support 18. The measuring pin 25 thereof, in the embodiment pursuant to FIGS. 3 and 4, does not directly impact against the contact shoulder 29. Arranged intermediate the measuring head and the measuring pin 25 is an angle lever 30. This lever is pivotally supported on the second measuring support 18 by means of a leaf spring 31. Arranged intermediate one arm of the angle lever 30 and the measuring support 18 is a threaded bolt with lock knots 33. Seated on the threaded bolt 32 intermediate the one arm of the angle lever and the measuring support 2 is a pressure spring 34. By means of this arrangement there can be adjusted a desired pretension of the angle lever.

The manner of operation of the arrangement illustrated in FIGS. 3 and 4 is generally as follows:

Through the intermediary of the pull carriage 1 the measuring head 20 is conveyed against the external threading 35. The leaf springs 16 and 17 assure that the teeth 23 will engage into the threading of the external threading 35. In conformance with the current diameter, by means of the leaf springs 5 and 6 there is displaced the measuring support 7 relative to the block 4. This displacement is detected by the sensor 14. At the movement of the arrangement towards the threading, the measuring head 26 comes into contact against the contact shoulder 36. In conformance with the present position of the contact shoulder 36 there will be pivoted the angle lever 30. This pivotal movement is detected by the sensing device 24.

In the following table there are represented examples of possibly occuring cases. Hereby, T1 is the measure of the deviation of the actual radius of the external threading at one location from the reference value of the radius at this location. T2 is a deviation of the actual position of the contact shoulder from the reference values; x is a constant factor.

| Case | T1-T2 | | Correction Value |
|---|---|---|---|
| 1 | 0x-0x | = | 0 |
| 2 | +10x-(-10x) | = | +20x |
| 3 | -10x-(-10x) | = | 0 |
| 4 | -10x-(+10x) | = | -20x |
| 5 | +10x-(+10x) | = | 0 |
| 6 | 0x-(-10x) | = | -10x |
| 7 | 0x-(-10x) | = | +10x |
| 8 | -10x-( 0x) | = | -10x |
| 9 | +10x- 0x | = | +10x |

In case 1 a subsequent working is not required, since the threading as well as the shoulder are at their reference value. In cases 3 and 5 there is also no subsequent working required, since both measures T1 and T2 are below measure (case 3) respectively excess measure (case 5) whereby the mutually opposite position of the external threading 25 and the contact shoulder 36 are correct in the manner in that the corresponding external threading with contact shoulder will lead to the desired sealed seating.

In cases 2, 7, 9 a subsequent working of the external threading 1 is necessary, since in case 2 the external threading is excessively sized and the contact shoulder is below size. In case 7 the contact shoulder is below size. In case 9 the external threading is excessively sized.

In cases 4, 6 and 8 the contct shoulder 36 must be reworked. In case 4 the external threading is below size and the contact shoulder 36 is above size. The corresponding is also effective for cases 6 and 8.

In total, in the two described embodiments, the comparison of the output magnitudes of the sensing devices 14 and 24 illustrate as to whether the threading or the contact shoulder must be reworked. This comparison can be carried out for example by means of electronic circuit. The present result (Correction Value) can be displayed either digitally or analog. The present corrective value can be introduced for the effectuation of the necessary correction either manually or automatically to the control of the work tool machine.

The described arrangements are simply constructed. By means of the leaf springs 5 and 6 or respectively 16 and 17 there is concurrently provided a guide and a resilient positioning for support of the first respectively second measuring supports. The measuring head 20 can be simply exchanged.

We claim:

1. Arrangement for a processing machine for the testing of the mutual position of a conical threading and a contact shoulder associated therewith through the intermediary of a sensing device, wherein a first measuring support is supported on a guide block, and is moveable relative to said guide block in a first direction of movement, a second measuring support is resiliently supported, on the first measuring support and said second support is moveable in a linear second direction of movement; a first measuring head is moveable towards the threading in the first direction of movement, and a second measuring head is moveable against the contact shoulder in the said second direction of movement, comprising for the movement of the first measuring head (20) against the threading (28;35) the first measuring head (7) is displaceable in the first direction of movement linearly relative to the guide block (1, 4) and the first direction of movement is located at an angle of 90° relative to the second direction of movement and that a first sensing device (14) detects the path of displacement of the first measuring support (7) or the first measuring head (20) in the said first direction of movement; a second sensing device (24) determines the path of displacement of the second measuring head (26) in the said second direction of movement.

2. Arrangement according to claim 1, characterized in that the first measuring support (7) is supported on a block (4) and the second measuring support (18) on the first measuring support (7) the intermediary of leaf springs (5, 6 or 16, 17) arranged on both sides thereof.

3. Arrangement according to claim 1 or 2, chracterized in that the first measuring support (7) is prestressed by means of a spring (8).

4. Arrangement according to claim 3, characterized in that a trunnion-bore connection (10, 11) is provided intermediate the first measuring support (7) and the block (4).

5. Arrangement according to claim 1, characterized in that the first sensing arrangement (14) is fastened on the first measuring support (7) and impacts against a contact surface (12) of the block (4) by means of a measuring pin (13).

6. Arrangement according to claim 1, characterized in that a tension spring (34) is provided intermediate the second measuring head (26) and the second measuring support (18).

7. Arrangement according to claim 1, characterized in that a second measuring head (26) is seated on a pivotable angle lever (30) which acts on a measuring pin (25) of the second sensing device (24) fastened onto the second measuring support (18).

8. Arrangement according to claim 7, characterized in that angle lever (30) is supported on the second measuring support (18) through a leaf spring (31).

9. Arrangement according to claim 1, characterized in that the first measuring head (20) is provided with at least one tooth (23) conforming to the threading (28, 35).

10. Arrangement according to claim 9, characterized in that the first measuring head (20) is provided with at least two teeth (23) and is pivotally supported by a trunnion (21) on the second measuring support (18).

11. Arrangement according to claim 10, characterized in that the measuring head (20) is supported on the measuring support (18) through two springs (22).

* * * * *